United States Patent
Urano et al.

(10) Patent No.: US 11,094,197 B2
(45) Date of Patent: Aug. 17, 2021

(54) SYSTEM AND METHOD FOR SWITCHING FROM A CURBSIDE LANE TO A LANE-OF-INTEREST

(71) Applicant: Toyota Research Institute, Inc., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 217 days.

(21) Appl. No.: 16/285,620

(22) Filed: Feb. 26, 2019

(65) Prior Publication Data

US 2020/0273341 A1    Aug. 27, 2020

(51) Int. Cl.
| | |
|---|---|
| *G08G 1/16* | (2006.01) |
| *G06Q 50/30* | (2012.01) |
| *G06Q 10/02* | (2012.01) |
| *G06K 9/00* | (2006.01) |

(52) U.S. Cl.
CPC ......... *G08G 1/167* (2013.01); *G06K 9/00798* (2013.01); *G06Q 10/02* (2013.01); *G06Q 50/30* (2013.01)

(58) Field of Classification Search
CPC ........ G08G 1/167; G06Q 50/30; G06Q 10/02; G06K 9/00798
See application file for complete search history.

(56) References Cited

U.S. PATENT DOCUMENTS

| | | |
|---|---|---|
| 8,712,624 B1 | 4/2014 | Ferguson et al. |
| 8,849,494 B1 | 9/2014 | Herbach et al. |
| 9,377,528 B2 * | 6/2016 | Birken ................. G01S 15/89 |

(Continued)

FOREIGN PATENT DOCUMENTS

| | | | |
|---|---|---|---|
| EP | 3355028 A1 | 1/2018 | |
| WO | WO-2019183844 A1 * | 10/2019 | ......... G06Q 30/0613 |

OTHER PUBLICATIONS

Huang, A. S. "Lane Estimation for Autonomous Vehicles using Vision and LIDAR", Ph.D. Thesis, E.E. Dept. MIT Figs. 5-4 (p. 79) and 5-5 (p. 81) (Year: 2010).*

(Continued)

*Primary Examiner* — Peter D Nolan
*Assistant Examiner* — Tanya C Sienko
(74) *Attorney, Agent, or Firm* — Christopher G. Darrow; Darrow Mustafa PC

(57) ABSTRACT

In one embodiment, a method for collecting lane data is disclosed. The method includes collecting lane data for a first lane of a plurality of lanes of a road from one or more sensors of a vehicle traveling in the first lane. The method includes receiving an identifier of a lane-of-interest from the plurality of lanes. The method includes determining a probability that the vehicle will receive a ride request while traveling in the first lane. The method includes determining that the probability satisfies a threshold. The method includes, in response to determining that the probability satisfies the threshold, causing the vehicle to travel in the lane-of-interest. The method includes collecting lane data for the lane-of-interest from the one or more sensors.

20 Claims, 7 Drawing Sheets

(56) References Cited

U.S. PATENT DOCUMENTS

| | | |
|---|---|---|
| 9,672,734 B1 | 6/2017 | Ratnasingam |
| 9,950,708 B1 * | 4/2018 | Cullinane et al. |
| 10,794,720 B2 * | 10/2020 | Slavin ................ G01C 21/3658 |
| 2011/0208745 A1 | 8/2011 | Dietsch et al. |
| 2014/0136414 A1 | 5/2014 | Abhyanker |
| 2015/0185034 A1 | 7/2015 | Abhyanker |
| 2015/0339928 A1 | 11/2015 | Ramanujam |
| 2016/0129787 A1 * | 5/2016 | Netzer ............. G08G 1/096741 |
| | | 701/36 |
| 2018/0046196 A1 * | 2/2018 | Hashimoto ..... B60W 30/18163 |
| 2018/0068495 A1 * | 3/2018 | Chainer .................. B60R 11/04 |
| 2018/0188045 A1 | 7/2018 | Wheeler et al. |
| 2019/0212738 A1 * | 7/2019 | Umetani ................ B60Q 1/503 |

OTHER PUBLICATIONS

Miller, J. and J. P. How, "Demand Estimation and Chance-Constrained Fleet Management for Ride Hailing" 2017 IEEE/RSJ International Conference on Intelligent Robots and Systems (IROS), Sep. 24-28, 2017, Vancouver, BC, Canada (Year: 2017).*

Yuan, J. et. al. "Where to Find My Next Passenger?" UbiComp'11, Sep. 17-21, 2011, Beijing, China (Year: 2011).*

* cited by examiner

SYSTEM AND METHOD FOR SWITCHING FROM A CURBSIDE LANE TO A LANE-OF-INTEREST

TECHNICAL FIELD

The subject matter described herein relates, in general, to a system and method for collecting lane data, and in particular, to using unoccupied autonomous vehicles to collect data from lanes-of-interest when traveling on multi-lane roads.

BACKGROUND

Vehicles currently rely on up-to-date map data for a variety a navigation features. For example, a vehicle may use map data to recommend a route to take between an origin and a destination location. The map data may include descriptions of roads including the number of lanes, locations of intersections and exits, and the locations of businesses. The map data may further include information such as the condition of the roads or lanes (e.g., potholes or weather-related conditions, and whether a road or lane is under construction).

Up-to-date map data may be particularly important for autonomous and semi-autonomous vehicles. For example, the autonomous and semi-autonomous vehicles may rely on the map data when selecting routes, changing lanes, and performing other navigation functions.

As may be appreciated, the condition of roads is constantly changing. For example, new roads or exits may be added, lanes may be added or removed from existing roads, the conditions of the roads and lanes may deteriorate due to wear or weather conditions, or the conditions of the roads and lanes may be improved due to construction. In another example, new businesses, housing, or other structures may be added or removed.

Accordingly, maintaining up-to-date map data is a difficult and expensive endeavor. One solution to this problem is the use of dedicated vehicles that are tasked with map data collection. When map data for a particular location becomes outdated due to construction or weather damage, one or more of these vehicles is dispatched to the location to collect new map data about the particular location. For example, the map data can include video data or image data collected from the location using one or more sensors associated with the vehicle. However, maintaining a fleet of vehicles for map data collection is expensive especially considering the multiplicity of roadways monitored and the frequency with which monitoring is to occur.

SUMMARY

In one embodiment, example systems and methods relate to collecting lane data from a lane-of-interest using autonomous vehicles that are not occupied. An autonomous vehicle is part of a transportation service where potential passengers can request an autonomous vehicle to take them to a destination location. The passengers may request the autonomous vehicle using an application on their smartphone, or by making a gesture or signal to the autonomous vehicle as it passes by. When the autonomous vehicle is unoccupied and looking for passengers while traveling on a multi-lane road, the autonomous vehicle selects a lane to collect lane data from according to lane selection criteria. The criteria may include the staleness of the existing lane data associated with the lane, evidence of defects associated with the lane (e.g., potholes), and whether the lane was previously or currently under construction. If the selected lane is not the curbside lane (i.e., the optimal lane for finding a passenger), the autonomous vehicle calculates the probability that the autonomous vehicle will find a passenger. The vehicle considers historical passenger data for the current location of the autonomous vehicle when calculating the probability. If the probability is greater than a threshold probability, the autonomous vehicle continues to travel in the curbside lane to find a passenger. Otherwise, the autonomous vehicle changes lanes and collects data from the selected lane. The autonomous vehicle remains in the selected lane, in one approach, until the probability of finding a passenger exceeds the threshold or the lane-of-interest changes.

In one embodiment, a lane selection system for collecting lane data is disclosed. The lane selection system includes one or more processors and a memory communicably coupled to the one or more processors. The memory stores an interest module including instructions that when executed by the one or more processors cause the one or more processors to desginate, in response to a determination that a vehicle is traveling on a road with a plurality of lanes, a lane-of-interest from the plurality of lanes. The lane-of-interest is a lane different from a first lane of the plurality of lanes that the vehicle is traveling on. The memory further stores a probability module including instructions that when executed by the one or more processors cause the one or more processors to determine a probability that the vehicle will receive a ride request while traveling in the first lane to generate, in response to a determination that the probability satisfies a threshold, a control signal to cause the vehicle to travel in the lane-of-interest.

In one embodiment, a method for collecting lane data is disclosed. The method includes collecting lane data for a first lane of a plurality of lanes of a road from one or more sensors of a vehicle traveling in the first lane. The method includes receiving an identifier of a lane-of-interest from the plurality of lanes. The method includes determining a probability that the vehicle will receive a ride request while traveling in the first lane. The method includes determining that the probability satisfies a threshold. The method includes causing, in response to determining that the probability satisfies the threshold, the vehicle to travel in the lane-of-interest. The method includes collecting lane data for the lane-of-interest from the one or more sensors.

In one embodiment, a non-transitory computer-readable medium for collecting lane data is disclosed. The non-transitory computer-readable medium includes instructions that when executed by one or more processors cause the one or more processors to perform one or more functions. The instructions include instructions to determine that a vehicle is traveling on a road with a plurality of lanes, wherein the vehicle is traveling in a curbside lane of the plurality of lanes. The instructions include instructions to designate, in response to determining that the vehicle is traveling on the road with the plurality of lanes, a lane-of-interest of the plurality of lanes. The instructions include instructions to determine a probability that the vehicle will receive a ride request while traveling in the curbside lane. The instructions include instructions to generate, in response to a determination that the probability satisfies a threshold, a control signal to cause the vehicle to travel in the lane-of-interest.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
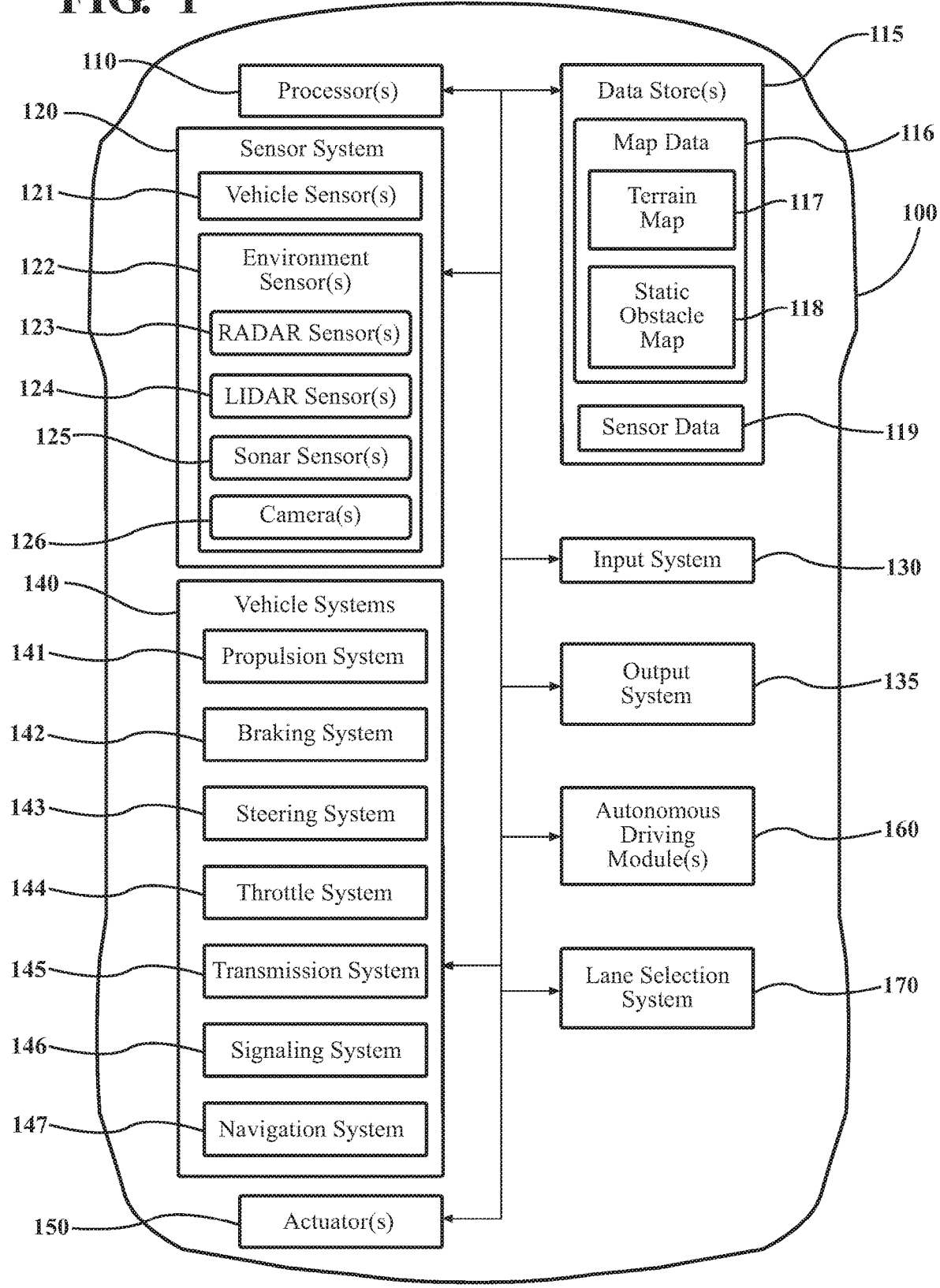
FIG. 1 illustrates one embodiment of a vehicle within which systems and methods disclosed herein may be implemented.

Systems, methods, and other embodiments associated with an autonomous vehicle collecting data about a lane while unoccupied are disclosed. As described previously, an autonomous vehicle may be part of a transportation service where users can request an autonomous vehicle to take them to a destination. Typically, users of the transportation service can request an autonomous vehicle using an application, or by making a gesture that is recognized by the autonomous vehicle as a ride request. For example, a user may hail a passing autonomous vehicle by raising their hand while looking at the autonomous vehicle. The autonomous vehicle may recognize the gesture as a request for a ride and may drive towards the user.

When traveling on a multi-lane road while unoccupied, the autonomous vehicle prefers to travel in the lane that is closest to the sidewalk (i.e., the curbside lane). Traveling in the curbside lane has several advantages. First, traveling in the curbside lane maximizes the exposure of the autonomous vehicle to potential passengers. Second, if the autonomous vehicle is hailed by a passenger on the sidewalk the autonomous vehicle does not have to change lanes to reach the passenger.

However, while traveling in the curbside lane has advantages with respect to finding passengers for an autonomous vehicle, there are conditions where an autonomous vehicle is unlikely to find passengers and therefore traveling in the curbside lane may not be the most efficient use of autonomous vehicle resources. For example, an autonomous vehicle may be traveling in a neighborhood at a time where demand for autonomous vehicles in known to be low.

Accordingly, to maximize the use of resources by unoccupied autonomous vehicles and solve the issue of map data collection described previously, when an autonomous vehicle is traveling in a curbside lane of a road with a plurality of lanes looking for passengers, the autonomous vehicle selects what is referred to herein as a "lane-of-interest." The lane-of-interest is the lane of the plurality of lanes that is the most interesting in terms of collecting map data. The map data associated with a specific lane is referred to herein as lane data.

Whether or not a lane is interesting for lane data collecting purposes may be based on a set of lane criteria. The lane criteria may include an age of the existing or previously collected lane data for a lane (i.e., data staleness), an amount of lane data already collected for a lane, whether a lane is currently or was previously under construction, or whether a lane is associated with defects (e.g., potholes). As will be described further below, selecting which lane is interesting for purposes of lane data collection may be made by the autonomous vehicle, a cloud-computing environment, or some combination of both.

If the selected lane-of-interest is not the curbside lane, the autonomous vehicle calculates a probability of finding a passenger. The probability is based on historical passenger data for the current time and location of the vehicle. If the probability is below a threshold indicating that the autonomous vehicle is unlikely to find a passenger, the autonomous vehicle travels in the lane-of-interest and collects lane data for the lane-of-interest using one or more sensors associated with the autonomous vehicle. Depending on the embodiment, the autonomous vehicle can store the collected lane data on the vehicle or can provide the data to the cloud-computing environment through a network or other communication means between the autonomous vehicle and cloud-computing environment.

The system for selecting a lane-of-interest for an autonomous vehicle described herein provides several advantages over conventional lane data collection methods. First, by collecting lane data from lanes-of-interest by autonomous vehicles when the probability of finding a passenger is low, the need for dedicated lane data collection vehicles is reduced which may reduce the overall cost of data collection. Second, because the autonomous vehicles are collecting the lane data from lanes-of-interest when they are unlikely to find a passenger, the opportunity costs due to missed passenger fares is minimized.

Referring to FIG. 1, an example of a vehicle 100 is illustrated. As used herein, a "vehicle" is any form of motorized transport. In one or more embodiments, the vehicle 100 is an automobile. While arrangements will be described herein with respect to automobiles, it will be understood that embodiments are not limited to automobiles. In some embodiments, the vehicle 100 may be any robotic device or form of motorized transport that, for example, includes one or more autonomous driving modes, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a lane selection system 170 that is implemented to perform methods and other functions as disclosed herein relating to selecting a lane-of-interest for the vehicle 100 and causing the vehicle 100 to collect lane data from the lane-of-interest when the probability of finding a passenger is low. The noted functions and methods will become more apparent with a further discussion of the figures.

Figure 2:
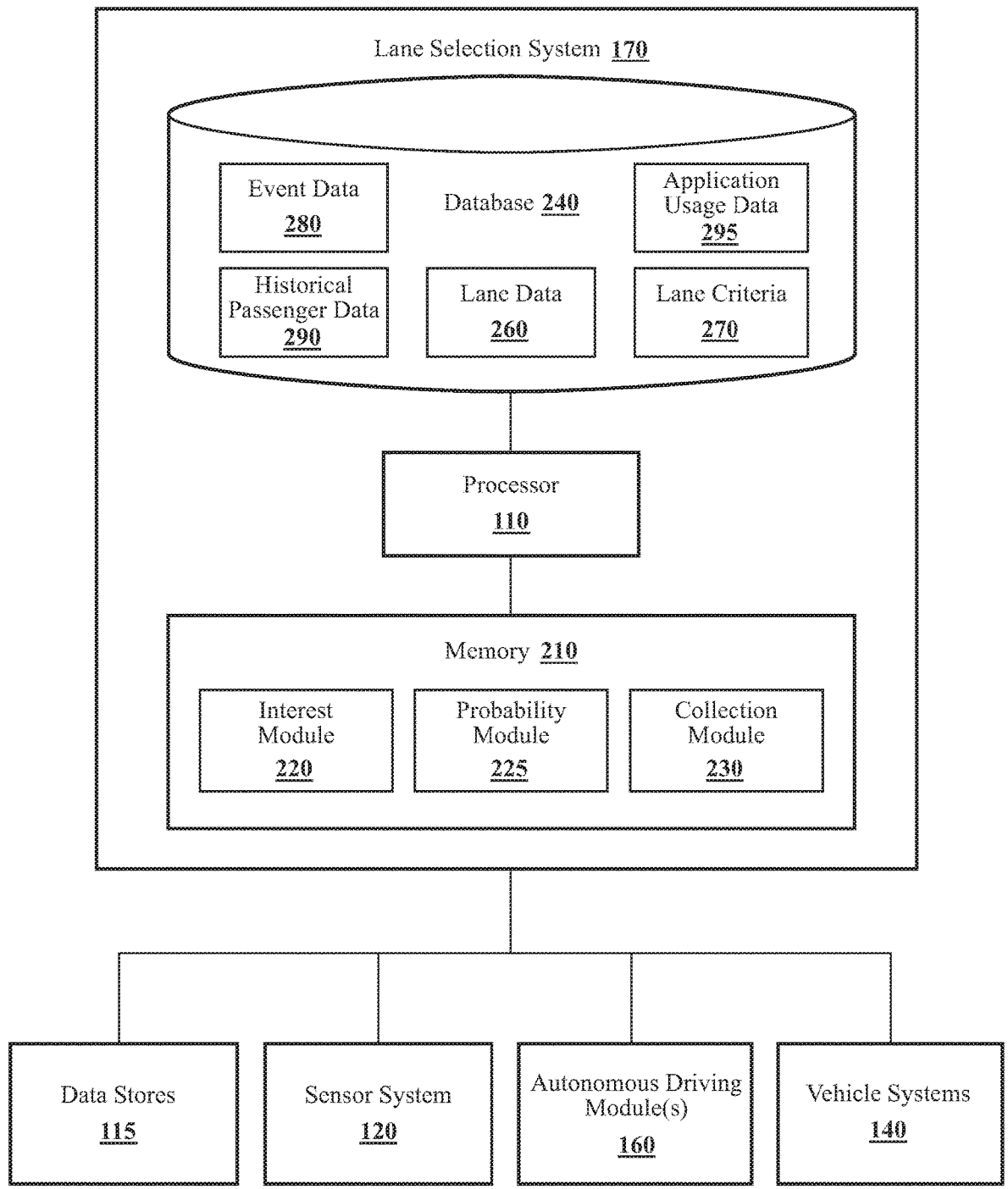
FIG. 2 illustrates one embodiment of a lane selection system that is configured to collect lane data from a lane-of-interest.
Figure 3:
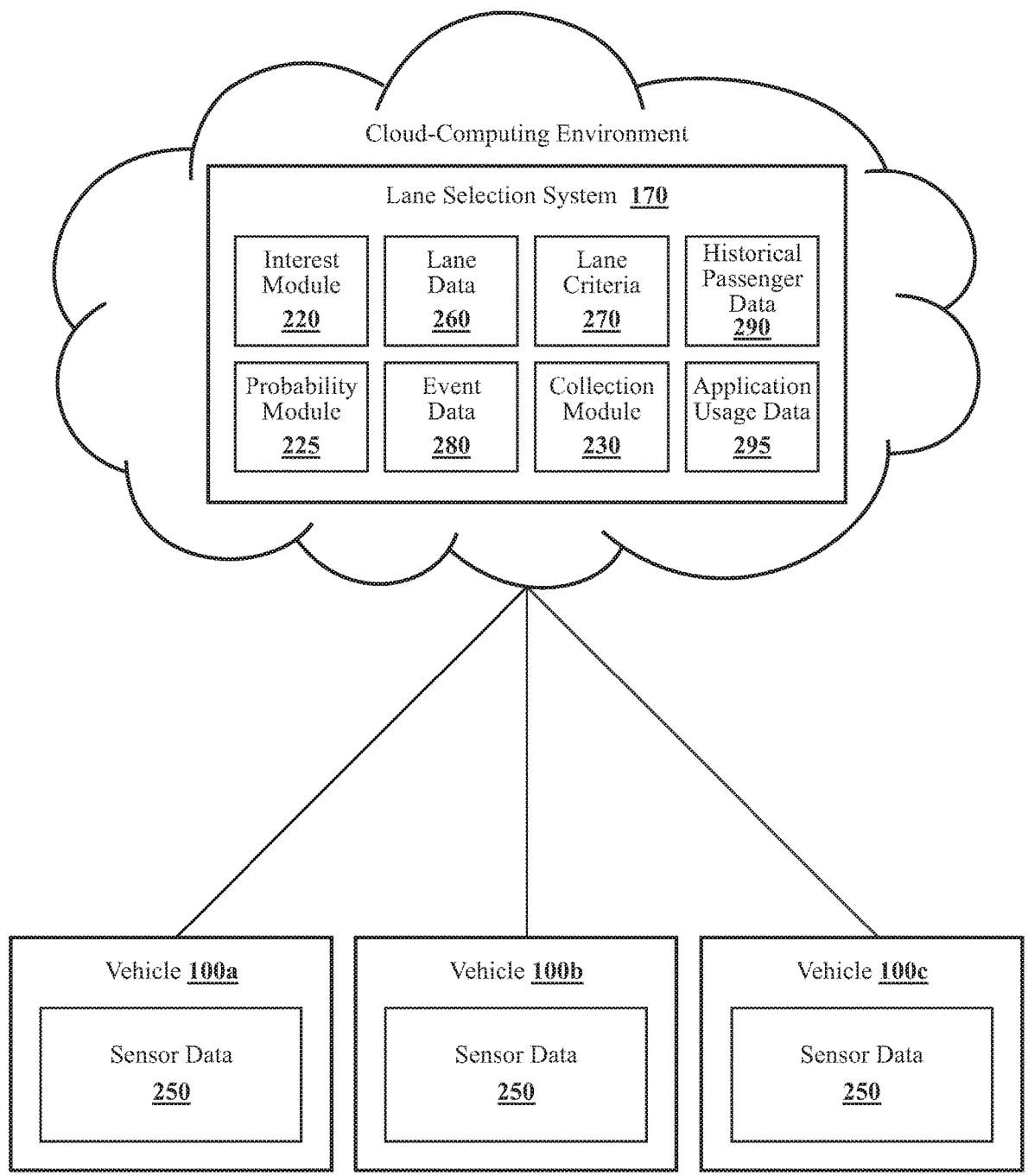
FIG. 3 illustrates one embodiment of the lane selection system using a cloud-computing environment.

With reference to FIGS. 2 and 3, one embodiment of the lane selection system 170 of FIG. 1 is further illustrated. The lane selection system 170 is shown as including a processor 110 from the vehicle 100 of FIG. 1. Accordingly, the processor 110 may be a part of the lane selection system 170, the lane selection system 170 may include a separate processor from the processor 110 of the vehicle 100 or the lane selection system 170 may access the processor 110 through a data bus or another communication path. In one embodiment, the lane selection system 170 includes a memory 210 that stores an interest module 220, probability module 225, and a collection module 230. The memory 210 is a random-access memory (RAM), read-only memory (ROM), a hard-disk drive, a flash memory, or other suitable memory for storing the modules 220, 225, and 230. The modules 220, 225, and 230 are, for example, computer-readable instructions that when executed by the processor 110 cause the processor 110 to perform the various functions disclosed herein.

The interest module 220 is configured to determine when the vehicle 100 is traveling on a road with a plurality of lanes. In one embodiment, the interest module 220 determines that the vehicle 100 is traveling on a road with a plurality of lanes based on information received from one or more vehicle systems 140 such as the navigation system 147 or based on information received from one or more data stores 115 such as the map data 116. For example, the interest module 220 may use global positions system (GPS) coordinates from the navigation system 147 to determine map data 116 corresponding to the road currently being traveled by the vehicle 100 and may determine that the road has a plurality of lanes based on the map data 116.

In some embodiments, the interest module 220 is further configured to determine when the vehicle 100 is traveling on a road with a plurality of lanes using sensor data 250. The lane selection module generally includes instructions that function to control the processor 110 to receive data inputs from one or more sensors of the sensor system 120 of the vehicle 100 that form the sensor data 250, which embodies observations of the surrounding environment of the vehicle 100 including one or more lanes. The one or more sensors may include radar 123 and camera 126. However, other sensors and combinations of sensors may be used. The interest module 220 processes the sensor data 250 to determine the number of lanes on the road that the vehicle 100 is traveling on. Any method for determining the number of lanes on the road based on sensor data 250 may be used.

Accordingly, the interest module 220, in one embodiment, controls the respective sensors to provide the data inputs in the form of the sensor data 250. Additionally, while the interest module 220 is discussed as controlling the various sensors to provide the sensor data 250, in one or more embodiments, the interest module 220 can employ other techniques to acquire the sensor data 250 that are either active or passive. For example, the interest module 220 may passively sniff the sensor data 250 from a stream of electronic information provided by the various sensors to further components within the vehicle 100. Moreover, as previously indicated, the interest module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of measurements acquired from multiple sensors.

Furthermore, in one embodiment, the lane selection system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 225, and 230 in executing various functions. In one embodiment, the database 240 includes sensor data 250 (not shown) along with, for example, other information that is used by the modules 220, 225, and 230 such as lane data 260, lane criteria 270, event data 280, historical passenger data 290, and application usage data 295. Of course, in further embodiments, the sensor data 250, lane data 260, lane criteria 270, event data 280, historical passenger data 290, and application usage data 295 are stored within the memory 210 or another suitable location.

The interest module 220 is configured to designate one of the lanes of the plurality of lanes as a lane-of-interest. The lane-of-interest is the lane of the plurality of lanes that is the most interesting to the interest module 220 for purposes of lane data 260 collection. The interest module 220 designates the lane-of-interest by assigning each lane of plurality of lanes a score according to the lane criteria 270.

As one example, the lane criteria 270 includes what is referred to as the lane data criterion. The lane data criterion is the age or amount of lane data 260 that has already been collected about a lane. Thus, the interest module 220 may assign scores to lanes with associated lane data 260 that is stale or incomplete according to the lane data criterion. The older or more incomplete the lane data 260 associated with a lane are, the greater the score assigned to the lane by the interest module 220, for example. The lane data 260 that were the least recently updated may be considered the oldest lane data 260.

As another example, the lane criteria 270 includes what is referred to herein as the construction criterion. The construction criterion is that lanes that are associated with construction are assigned higher scores than lanes that are not associated with construction. A lane may be associated with construction if it was known to have been previously or recently under construction. The interest module 220 determines that a lane was previously or recently under construction based on navigation data 147 received from the vehicle systems 140, and/or based on map data 116 received from the data stores 115. Alternatively, or additionally, the interest module 220 determines that a lane is associated with construction (or no longer associated with construction) by processing the sensor data 250 to look for indicators of construction such as signs, construction vehicles, and cones or pylons.

As another example, the lane criteria 270 includes what is referred to herein as the defects criterion. The defects criterion is that lanes that are associated with defects are assigned higher scores than lanes that are not associated with defects. Defects may include road defects such as potholes, broken lane guards, missing lane markers, and debris such as branches or trees. Other types of road defects may be included. The interest module 220 determines that a lane has one or more defects based on navigation data 147 received from the vehicle systems 140, and/or based on map data 116 received from the data stores 115. For example, a previous vehicle 100 may have identified defects in the lane such as potholes and may have provided information about the potholes that was added to the map data 116. Alternatively, or additionally, the interest module 220 determines that a lane is associated with defects (or no longer associated with defects) by processing the sensor data 250 to look for defects such as potholes, remnants of vehicle accidents, and trees or other debris in the lane.

The interest module 220 scores each of the lanes of the plurality of lanes using the lane criteria 270. The particular criterion used, and the relative weights assigned to each criterion, may be set by a user or administrator. For example, an administrator may determine that a lane associated with construction receives a higher score than a lane associated with old lane data 260. The interest module 220 designates the lane with the highest assigned score as the lane-of-interest.

The probability module 225 is configured to calculate a probability that the vehicle 100 will receive a ride request, and to change lanes to the lane-of-interest when the probability of receiving a ride request is below a threshold probability. As described previously, the vehicle 100 currently travels in a curbside lane of the plurality of lanes when looking for a passenger or waiting for a ride request. However, when the probability of receiving a ride request is below the threshold, the vehicle 100 instead travels in the lane-of-interest to collect lane data. In some embodiments, the probability module 225 changes lanes by sending a control signal to one or more autonomous driving modules 160 associated with the vehicle 100 to travel in the lane-of-interest.

In some embodiments, the probability module 225 is configured to calculate the probability of receiving a ride request using historical passenger data 290 and a current time and current location of the vehicle 100. The historical passenger data 290 includes historical autonomous vehicle 100 usage data such as the number of passengers that requested autonomous vehicles 100 at different dates, times, and locations, for example. Depending on the embodiment, the historical passenger data 290 may have been generated and collected over time from a variety of vehicles 100 at a variety of locations. The probability module 225 determines the current location of the vehicle 100 through a GPS or other location determination component of the vehicle systems 140.

In some embodiments, the probability module 225 is configured to calculate the probability of receiving a ride request using event data 280 and a current time and current location of the vehicle 100. The event data 280 include identifiers of events that may affect demand for autonomous vehicles 100. The identified events include concerts, sporting events, graduations, and weddings, for example. The event data 280 may further include, for each identified event, a start time, end time, and an indication of the locations or areas that are associated with the identified event.

In some embodiments, the probability module 225 is configured to calculate the probability of finding a passenger using application usage data 295. The application usage data 295 is data from an application used to request rides from autonomous vehicles 100. The application usage data 295 indicates the number of users near the vehicle 100 that are currently using the application. A high number of users near the vehicle 100 indicates that one or more of the users are going to request a ride from the vehicle 100, for example.

In some embodiments, the probability module 225 is configured to calculate the probability of receiving a ride request using sensor data 250. For example, the probability module 225 receives sensor data 250 such as video data of the sidewalk adjacent to the vehicle 100 and processes the video data to estimate the number of pedestrians on the sidewalk. The number of pedestrians may be estimated using computer vision techniques such as object or face recognition. Other techniques may be used. The higher the number of estimated pedestrians, the higher the likelihood that the vehicle 100 may receive a ride request, for example.

The probability module 225 is configured to estimate the probability of finding a passenger using some or all of the event data 280, historical passenger data 290, and application usage data 295. Other information may be considered by the probability module 225 such as current weather or environmental conditions that may make passengers likely to request an autonomous vehicle 100.

The probability module 225 calculates the probability of receiving a ride request and causes the vehicle 100 to travel in the lane-of-interest (i.e., leave the curbside lane) when the determined probability is less than a threshold probability. The threshold probability may be set by a user or administrator. The probability module 225 may cause the vehicle 100 to travel in the lane-of-interest by generating a control signal, and by providing the generated control signal to one or more autonomous driving modules 160 associated with the vehicle 100.

In some embodiments, the threshold probability may be static. In other embodiments the threshold probability may be dynamic and may be calculated by the probability module 225 using a variety of factors. As one example, the threshold probability is based on the score of the lane that was designated as the lane-of-interest. As described previously, in one embodiment, the interest module 220 calculates a score for each lane, and designates the lane with the highest score as the lane-of-interest. A high score may indicate that the corresponding lane data 260 may have a high value or utility. Accordingly, the probability module 225 calculates the threshold probability so that a high score for the lane-of-interest results in a high threshold probability, and vice versa.

As another example, the threshold probability is based on the current fare or cost of a ride in the vehicle 100. In some embodiments, the cost of ride in the vehicle 100 may vary based on the current supply of, and demand for, autonomous vehicles at or around a location. When the cost of a ride in the vehicle 100 is high, the vehicle 100 may be less likely to forgo the potential fares by traveling in the lane-of-interest instead of the curbside lane. Accordingly, the probability module 225 calculates the threshold probability so that a high ride cost results in a low threshold probability, and vice versa.

The collection module 230 is configured to collect lane data 260 while the vehicle 100 travels in the lane-of-interest. The lane data 260 may be similar to the map data 116 and may include information about the lane such as lane geometry, markings, structures, and other features of the lane. The lane data 260 may identify any obstacles, defects, or hazards associated with the lane such as potholes, and whether there is evidence of construction in the lane (e.g., cones, construction equipment, and signs). Other types of information about a road or lane may be included in the lane data 260.

In one embodiment, the collection module 230 is configured to collect the lane data 260 by receiving sensor data 250 associated with one or more sensors from the sensor system 120 of the vehicle 100. The collection module 230 may collect the lane data 260 from the received sensor data 250. For example, the sensor data 250 may include video or image data of the lane taken by one or more cameras 126 of the sensor system 120. The collection module 230 may be configured to extract the lane data 260 from the video or image data using computer vision techniques such as object recognition and lane recognition.

The collection module 230 is configured to make one or more determinations of whether lane data 260 collection is feasible before collecting lane data 260 for a lane. In one embodiment, the collection module 230 determines if there is enough storage space to store the collected lane data 260 before collecting lane data 260 from the lane-of-interest. As may be appreciated, lane data 260 and/or sensor data 250 may use a large amount of storage space with respect to either the memory 210 or the database 240 of the lane selection system 170. Accordingly, before beginning to collect the lane data 260, the collection module 230 determines if there is sufficient storage space to store the collected lane data on the lane selection system 170. If there is not sufficient storage space to collect the lane data 260 from the lane-of-interest, the collection module 230 may cause the vehicle 100 to return to the curbside lane.

In another embodiment, the collection module 230 determines if current environmental conditions support collecting lane data 260 before collecting lane data 260 from the lane-of-interest. In particular, the collection module 230 determines if the current environmental conditions make the collected lane data 260 unreliable or incomplete because of issues with the corresponding sensor data 250. The environmental conditions may include weather conditions or light conditions. For example, if it is raining or late at night, the cameras 126 or other sensors 121 may generate lower quality sensor data 250. As a result, any lane data 260 collected from the sensor data 250 may be incomplete or of a lower quality. Accordingly, the collection module 230 may not collect lane data 260 when the environmental conditions are poor. The collection module 230 determines the environmental conditions using the sensor data 250, or from syndicated weather data, for example. If the environmental conditions do not support collecting the lane data 260 from the lane-of-interest, the collection module 230 causes the vehicle 100 to return to the curbside lane.

With reference to FIG. 3, another embodiment of the lane selection system 170 of FIG. 1 is further illustrated. The lane selection system 170 is implemented using a cloud-computing environment. In particular, the interest module 220, probability module 225, lane data 260, lane criteria 270, event data 280, historical passenger data 290, and application usage data 295 are implemented or stored using the cloud-computing environment.

The lane selection system 170 may be in communication with a plurality of vehicles 100 (i.e., the vehicles 100a, 100b, and 100c) through a network or other communication means. While only three vehicles 100 are shown, it is for illustrative purposes only; there is no limit to the number of vehicles 100 that may be supported. The vehicles 100 are autonomous vehicles and are part of a fleet of autonomous vehicles 100 that provide transportation services to passengers or users of a ride requesting application, for example.

In the embodiment shown, each vehicle 100 includes its own sensor data 250. In other embodiments, each vehicle 100 stores its own lane data 260, lane criteria 270, event data 280, historical passenger data 290, and/or application usage data 295.

The lane selection system 170 is configured to determine, for each vehicle 100, whether the vehicle 100 is traveling on a road with a plurality of lanes and is unoccupied. In one embodiment, the vehicles 100 are configured to send an alert or message to the lane selection system 170 when they are traveling on a road with multiple lanes and are unoccupied. The alert or message may be sent using a network or other communication means between each vehicle 100 and the lane selection system 170. In another embodiment, the lane selection system 170 is part of the transportation service and/or ride requesting application that is associated with the vehicles 100. In such an embodiment, the lane selection system 170 knows whether a vehicle 100 is traveling on a road with a plurality of lanes and is unoccupied.

The interest module 220 is configured to designate, for each unoccupied vehicle 100 traveling on a road with a plurality of lanes, a lane-of-interest. The lane-of-interest designated for each vehicle 100 is selected by the interest module 220 using the lane criteria 270 as described previously. For example, the interest module 220 scores each lane based on one or more of the lane criteria 270 and designates the lane with the highest score as the lane-of-interest.

The probability module 225 is configured to calculate, for each vehicle 100, the probability that the vehicle 100 will receive a ride request based on the current location of the vehicle 100. As described previously, each unoccupied vehicle 100 may by default travel in the curbside lane to maximize their exposure to potential passengers and to minimize the time needed to travel to a passenger that requests the vehicle 100. Depending on the embodiment, the probability module 225 calculates the probability using one or more of event data 280, historical passenger data 290, and application usage data 295. The probability module 225 may also calculate the probability using other data such as the current time and weather conditions.

The probability module 225 is configured to compare, for each vehicle 100, the calculated probability to a threshold probability. If the calculated probability for a vehicle 100 is less than the threshold probability, the probability module 225 sends an instruction to the vehicle 100 to travel in the lane-of-interest. The probability module 225 sends the instruction to the vehicle 100 using the network or other communication means between the lane selection system 170 and each of the vehicles 100. If the calculated probability for a vehicle 100 is greater than the threshold probability, the vehicle 100 may continue traveling in the curbside lane of the plurality of lanes. Depending on the embodiment, the threshold probability used for each vehicle 100 may be the same or may be based on vehicle specific factors such as the score calculated for the lane-of-interest, or the current fare or rate being charged by the vehicle 100 for transportation services.

After a vehicle 100 receives the instruction to leave the curbside lane and travel in the lane-of-interest, the vehicle 100 may then begin to receive sensor data 250 associated with the lane-of-interest from the sensor systems 120 associated with the vehicle 100.

In one embodiment, the vehicle 100 sends some or all of the received sensor data 250 to the collection module 230. The collection module 230 processes the sensor data 250 using object recognition or other computer vision techniques to generate the lane data 260 for the vehicle 100.

In another embodiment, the vehicle 100 generates the lane data 260 from the sensor data 250. The vehicle 100 sends the lane data 260 to the collection module 230 through the network or other communication means between the vehicle 100 and the collection module 230.

Figure 4:
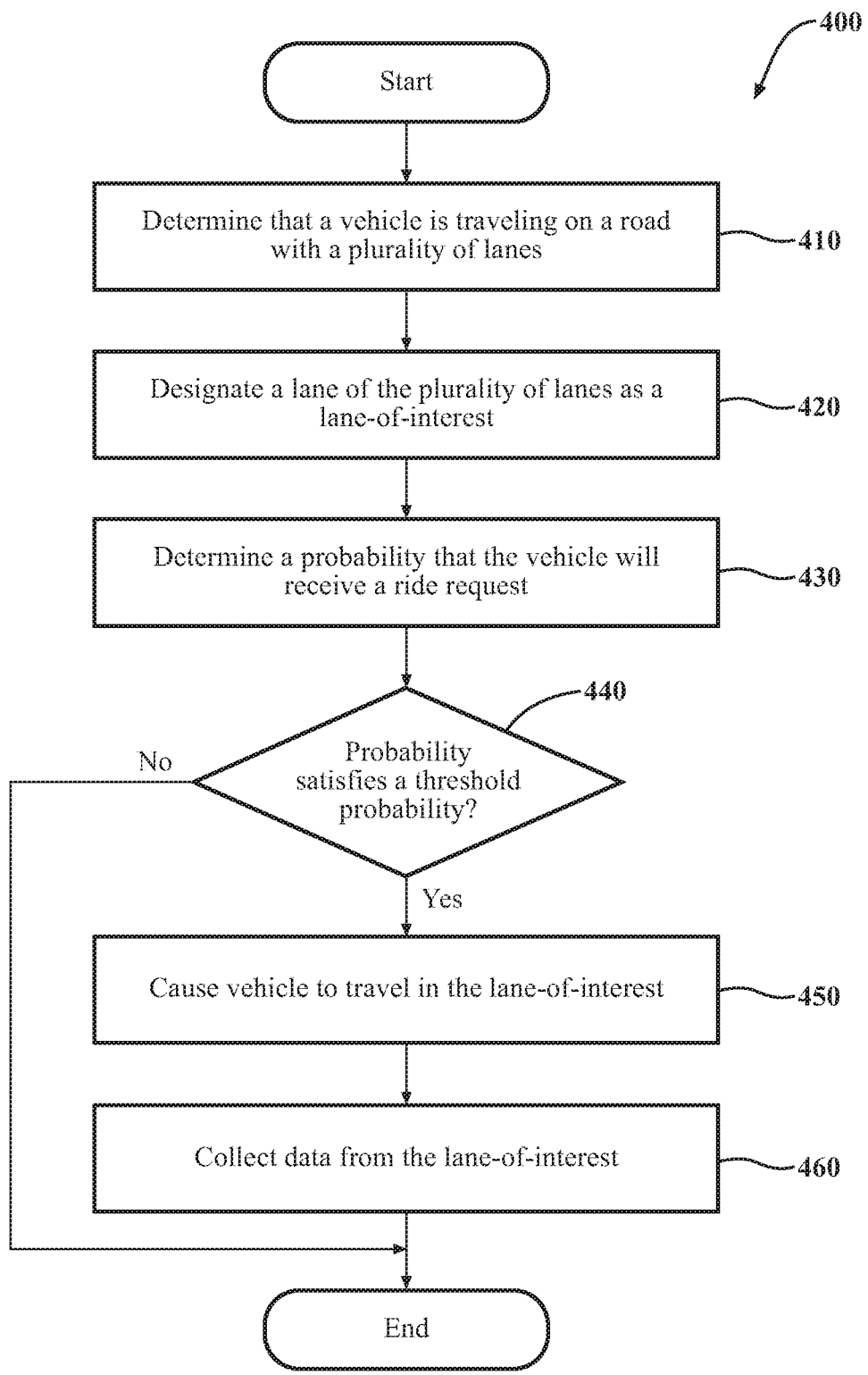
FIG. 4 illustrates a flowchart of a method that is associated with collecting lane data from a lane-of-interest.

Additional aspects of collecting lane data 260 from a lane-of-interest will be discussed in relation to FIG. 4. FIG. 4 illustrates a flowchart of a method 400 that is associated with collecting lane data from a lane-of-interest. The method 400 will be discussed from the perspective of the lane selection system 170 of FIGS. 1, 2, and 3. While the method 400 is discussed in combination with the lane selection system 170, it should be appreciated that the method 400 is not limited to being implemented within the lane selection system 170 but is instead one example of a system that may implement the method 400.

At 410, the interest module 220 determines that a vehicle 100 is traveling on a road with a plurality of lanes. In one embodiment, the interest module 220 may receive sensor data 250 from the camera 126 of the vehicle 100 and determines that there is a plurality of lanes. In another embodiment, the interest module 220 makes the determination based on information received from one or more vehicle systems 140 such as the navigation system 147. The vehicle 100 may currently be unoccupied and may be traveling in a curbside lane of the plurality of lanes.

At 420, the interest module 220 designates a lane of the plurality of lanes as a lane-of-interest. The interest module 220 designates a lane as the lane-of-interest by generating a score for each lane based on lane criteria 270. The lane criteria 270 may include a lane data criterion, a construction criterion, or a defect criterion. Other criteria may be used to score the lanes. The interest module 220 determines the lane of the plurality of lanes with a greatest score and designates the lane with the highest score as the lane-of-interest. The lane-of-interest may be a lane different from the curbside lane.

Figure 6:
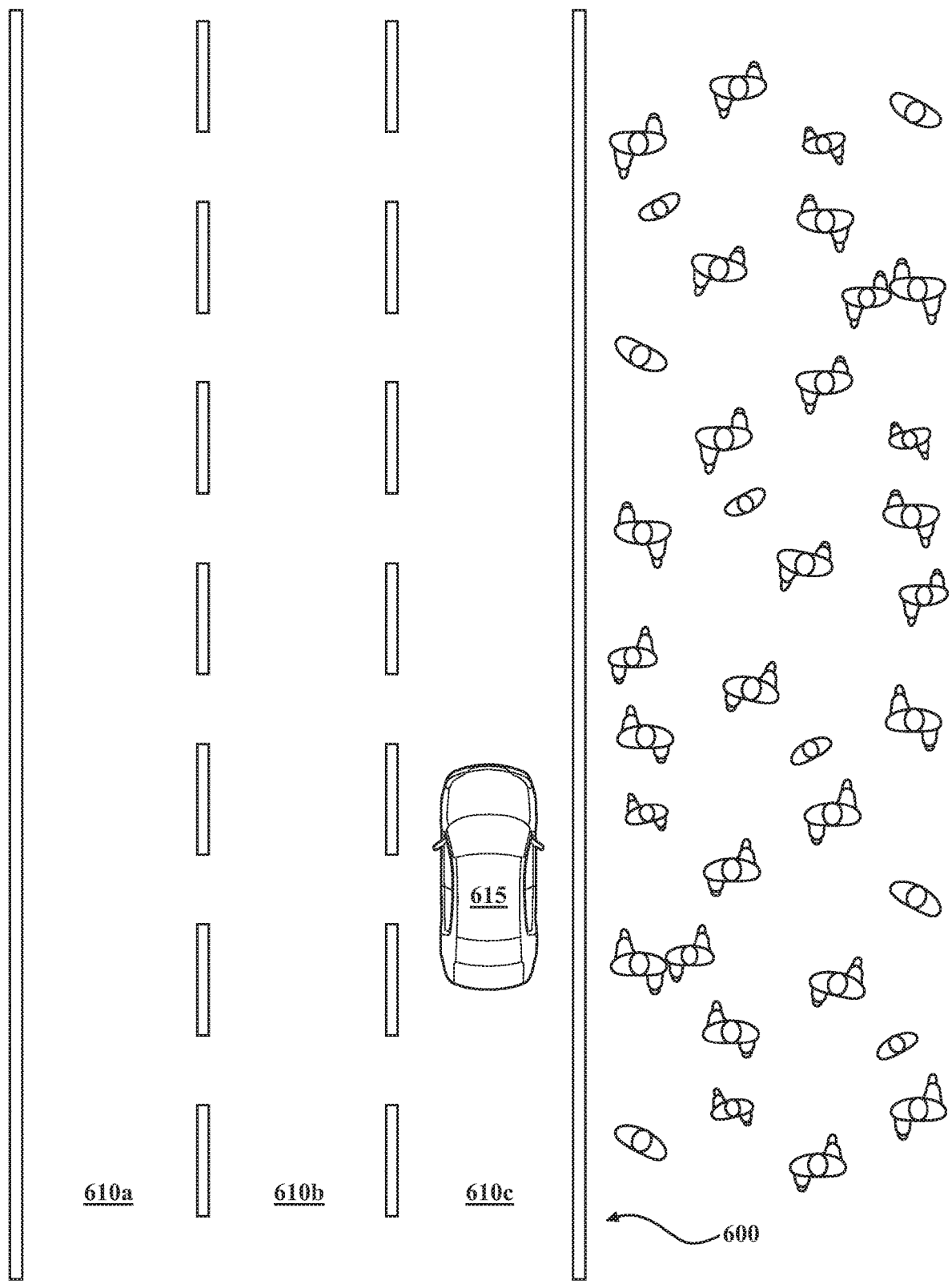
FIG. 6 illustrates an example of a vehicle traveling in a lane.

By way of example, FIG. 6 illustrates an example of a vehicle 615 traveling on a road 600. The road 600 includes three lanes 610 including a lane 610a, a lane 610b, and a lane 610c. The vehicle 615 is currently traveling in the lane 610c of the road 600. The lane 610c is the curbside lane and is the lane of the plurality of lanes that is closest to the sidewalk. The interest module 220 has determined that the road 600 includes the lanes 610 and has designated the lane 610b as the lane-of-interest.

In some embodiments, the lane of interest module 220 may not designate a lane-of-interest. For example, all of the lanes may have a low score using any of the lane criteria 270. The threshold score to designate a lane-of-interest may be set by a user or administrator. If no lane-of-interest is designated, the method 400 may end and the vehicle 100 may remain in the curbside lane.

At 430, the probability module 225 determines a probability that the vehicle will 100 receive a ride request. The probability module 225 determines the probability that the vehicle will receive a ride request while traveling in the curbside lane based on one or more of historical passenger data 290, event data 280, and application usage data 295. Other information may be used to determine the probability such a current date or time, day of the week, and weather conditions.

At 440, the probability module 225 determines if the determined probability satisfies a threshold probability. In one embodiment, the determined probability satisfies the threshold probability if it is less than the threshold probability. A probability above the threshold probability indicates that the vehicle 100 is likely to receive a ride request in the curbside lane, while a probability below the threshold probability indicates that the vehicle is unlikely to receive a ride request in the curbside lane. The threshold may be set by a user or administrator and may be adjusted depending on factors such as the score assigned to the lane-of-interest and a current rate or fare being charged by the vehicle 100. If the probability satisfies the threshold probability the method may continue at 450. Else, the method 400 may end and the vehicle 100 may continue to travel in the curbside lane.

At 450, the probability module 225 causes the vehicle to travel in the lane-of-interest. For example, the probability module 225 may instruct one or more autonomous driving modules 160 associated with the vehicle 100 to travel in the lane-of-interest by sending a control signal.

At 460, the collection module 230 collects lane data 260 from the lane-of-interest. In one embodiment, the interest module 220, the probability module 225, and the collection module 230 may be located on the same vehicle 100 (i.e., FIG. 2). In another embodiment, the interest module 220, the probability module 225, and the collection module 230 may be part of a cloud-computing environment.

In embodiments where the collection module 230 is located in the vehicle 100 (e.g., FIG. 2), the collection module 230 receives sensor data 250 from the sensor system 120 and processes the sensor data 250 to collect the lane data 260 using object recognition or other computer vision techniques. The collection module 230 stores the lane data 260 on the vehicle 100 and later uploads or otherwise provides the lane data 260 to a repository. Alternatively, the collection module 230 stores some or all of the sensor data 250 on the vehicle 100 and later provides the sensor data 250 to the repository. The repository then generates the lane data 260 from the sensor data 250.

In embodiments where the collection module 230 is part of a cloud-computing environment (e.g., FIG. 3), the collection module 230 receives the sensor data 250 from the sensor system 120 of the vehicle 100 through a network or other communications means between the vehicle 100 and the collection module 230. The collection module 230 of the cloud-based environment processes the sensor data 250 to collect the lane data 260 as described above. Alternatively, the vehicle 100 processes the sensor data 250 to collect the lane data 260 and provides the lane data 260 to the collection module 230 of the cloud-computing environment.

Figure 7:
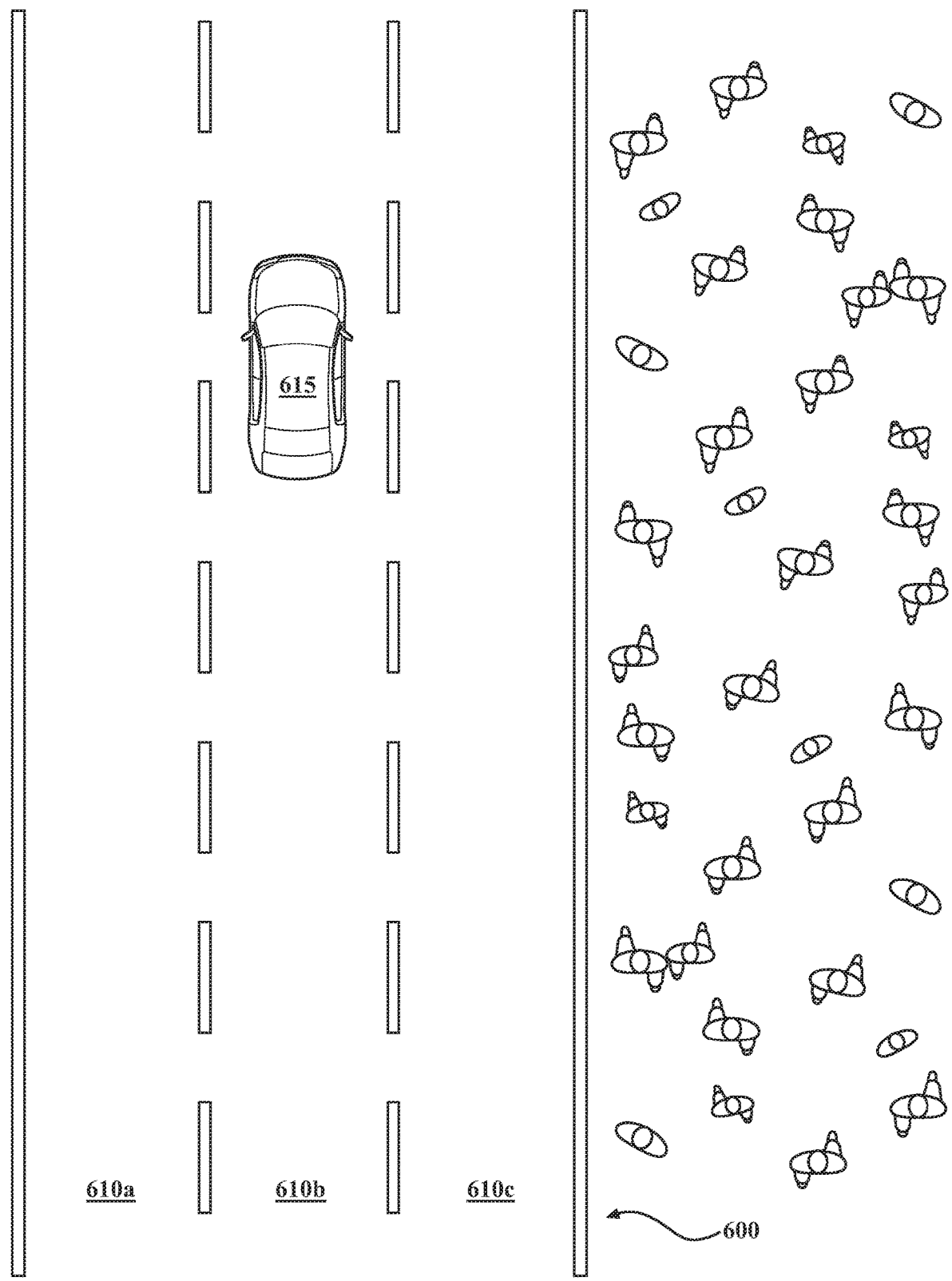
FIG. 7 illustrates an example of a vehicle traveling in a lane-of-interest.

Continuing the example of FIG. 6, FIG. 7 illustrates an example of the vehicle 615 after having changed lanes. As shown, the vehicle 615 is now traveling in the lane 610b which was designated as the lane-of-interest. As the vehicle 615 travels in the lane 610b it may collect and store lane data 260.

Figure 5:
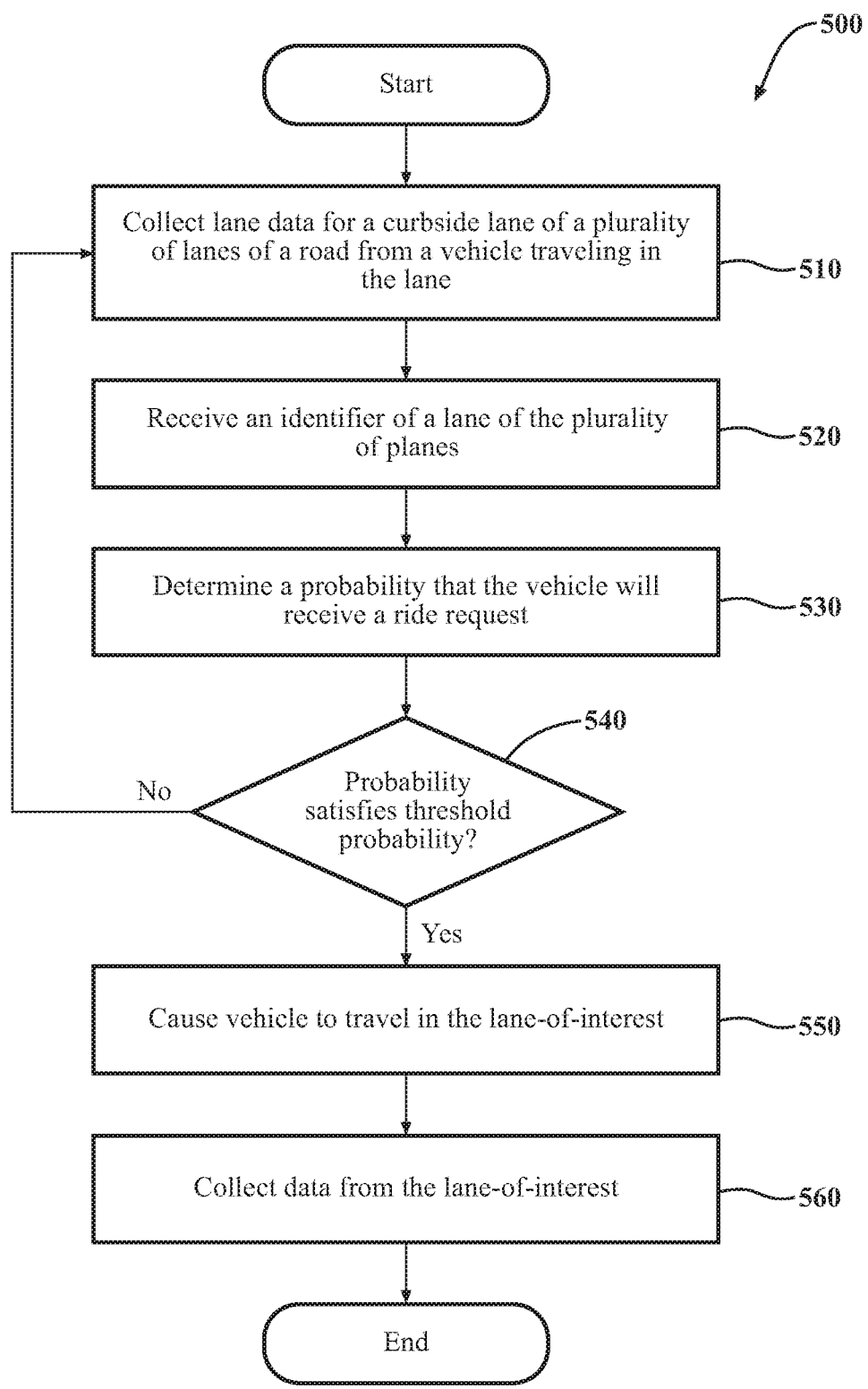
FIG. 5 illustrates a flowchart of a method that is associated with collecting lane data from a lane-of-interest.

Additional aspects of collecting lane data 260 from a lane-of-interest will be discussed in relation to FIG. 5. FIG. 5 illustrates a flowchart of a method 500 that is associated with collecting lane data from a lane-of-interest. The method 500 will be discussed from the perspective of the lane selection system 170 of FIGS. 1, 2, and 3. While the method 500 is discussed in combination with the lane selection system 170, it should be appreciated that the method 500 is not limited to being implemented within the lane selection system 170 but is instead one example of a system that may implement the method 500.

At 510, the collection module 230 collects lane data 260 for a lane that a vehicle 100 is traveling in. The vehicle 100 may be an autonomous vehicle and may be traveling on a road with a plurality of lanes. In particular, the vehicle 100 may be unoccupied and may be traveling in a curbside lane of the plurality of lanes. The collection module 230 receives sensor data 250 from the sensor system 120 associated with the vehicle 100 and processes the sensor data 250 to collect the lane data 260 using object recognition or other computer vision techniques. Depending on the embodiment, the collection module 230 is located on the vehicle 100 or is located in a cloud-computing environment.

At 520, the collection module 230 receives an identifier of a lane of the plurality of lanes. The identified lane may be the lane-of-interest and may have been identified by the interest module 220 using lane criteria 270. The lane-of-interest may be a different lane of the plurality of lanes than the curbside lane. Depending on the embodiment, the interest module 220 is located on the vehicle 100 or is located in the cloud-computing environment.

At 530, the probability module 225 determines a probability that the vehicle will receive a ride request. The probability module 225 determines the probability that the vehicle will receive a ride request while traveling in the curbside lane based on one or more of historical passenger data 290, event data 280, and application usage data 295. Other information may be used to determine the probability such as a current date or time, day of the week, and weather conditions.

At 540, the probability module 225 determines if the determined probability satisfies a threshold probability. In one embodiment, the determined probability satisfies the threshold probability if it is less than the threshold probability. If the probability satisfies the threshold probability the method may continue at 550. Else, the method 500 may return to 510 where the vehicle 100 may continue to collect lane data 260 for the curbside lane.

At 550, the probability module 225 causes the vehicle to travel in the lane-of-interest. For example, the probability module 225 may instruct one or more autonomous driving modules 160 associated with the vehicle 100 to travel in the lane-of-interest.

At 560, the collection module 230 collects lane data 260 from the lane-of-interest. The collection module 230 may receive sensor data 250 from the sensor system 120 associated with the vehicle 100 and may process the sensor data 250 to collect the lane data 260 using object recognition or other computer vision techniques. The collection module 230 may continue to collect lane data 260 from the lane-of-interest until the vehicle 100 becomes occupied, or until the interest module 220 selects a new lane-of-interest, for example.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the lane selection system 170, and/or the autonomous driving module(s) 160 can be operatively connected to communicate with the various vehicle systems 140 and/or individual components thereof. For example, returning to FIG. 1, the processor(s) 110, the lane selection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane selection system 170, and/or the autonomous driving module(s) 160 may control some or all of these vehicle systems 140 and, thus, may be partially or fully autonomous.

The processor(s) 110, the lane selection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane selection system 170, and/or the autonomous driving module(s) 160 can control the direction and/or speed of the vehicle 100. The processor(s) 110, the lane selection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the lane selection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the occupancy module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A lane selection system for collecting lane data, comprising:
   one or more processors; and
   a memory communicably coupled to the one or more processors and storing:
      a probability module including instructions that when executed by the one or more processors cause the one or more processors to:
         receive, from an interest module, a designation of a lane-of-interest from a plurality of lanes, wherein the lane-of-interest is a lane, of the plurality of lanes, having a greatest need, determined by the interest module according to a set of lane criteria, to have lane data collected, a vehicle is traveling in a first lane of the plurality of lanes, the first lane being different from the lane-of-interest;
         determine a probability that the vehicle will receive a ride request while traveling in the first lane; and
         in response to a determination that the probability satisfies a threshold, generate a control signal to cause the vehicle to travel in the lane-of-interest.

2. The lane selection system of claim 1, further comprising the interest module including instructions that when executed by the one or more processors cause the one or more processors to:
   in response to a determination that the vehicle is traveling on a road with the plurality of lanes, designate the lane-of-interest from the plurality of lanes.

3. The lane selection system of claim 2, wherein the instructions that when executed by the one or more processors cause the one or more processors to designate the lane-of-interest from the plurality of lanes further comprise instructions that when executed by the one or more processors cause the one or more processors to:
  determine a lane of the plurality of lanes that has one or more defects; and
  designate the lane of the plurality of lanes that has one or more defects as the lane-of-interest.

4. The lane selection system of claim 2, wherein the instructions that when executed by the one or more processors cause the one or more processors to designate the lane-of-interest from the plurality of lanes further comprise instructions that when executed by the one or more processors cause the one or more processors to:
  determine a score for each lane of the plurality of lanes based on the lane criteria; and
  designate a lane of the plurality of lanes as the lane-of-interest according to determinations of scores.

5. The lane selection system of claim 4, wherein the probability module further includes instructions to calculate the threshold according to the scores.

6. The lane selection system of claim 1, further comprising a collection module including instructions that when executed by the one or more processors cause the one or more processors to:
  collect the lane data from one or more sensors associated with the vehicle while the vehicle travels in the lane-of-interest; and
  store the lane data about the lane-of-interest.

7. The lane selection system of claim 1, wherein the probability module further includes instructions to:
  in response to a determination that the probability does not satisfy the threshold, cause the vehicle to travel in the first lane.

8. The lane selection system of claim 1, wherein at least one of the one or more processors is part of the vehicle or is part of a cloud-computing environment.

9. The lane selection system of claim 1, wherein the first lane is a curbside lane.

10. The lane selection system of claim 1, wherein the instructions that when executed by the one or more processors cause the one or more processors to determine the probability that the vehicle will receive the ride request while traveling in the first lane further comprise instructions that when executed by the one or more processors cause the one or more processors to determine the probability according to one or more of historical passenger data, event data, or application usage data.

11. The lane selection system of claim 1, wherein the probability module further includes instructions to calculate the threshold according to a current fare for the vehicle.

12. A method for collecting lane data, the method comprising:
  collecting, by a processor, the lane data for a first lane of a plurality of lanes from one or more sensors of a vehicle, wherein the vehicle is traveling in the first lane;
  receiving, by the processor, an identifier of a lane-of-interest from the plurality of lanes, wherein the lane-of-interest is a lane, of the plurality of lanes, having a greatest need, determined by the processor according to a set of lane criteria, to have the lane data collected;
  determining, by the processor, a probability that the vehicle will receive a ride request while traveling in the first lane, the first lane being different from the lane-of-interest;
  in response to a determination that the probability satisfies a threshold, generating, by the processor, a control signal to cause the vehicle to travel in the lane-of-interest; and
  collecting, by the processor, the lane data for the lane-of-interest from the one or more sensors.

13. The method of claim 12, further comprising providing, by the processor, the lane data for the lane-of-interest to a cloud-computing environment.

14. The method of claim 12, further comprising determining, by the processor, the threshold based on a current fare for the vehicle.

15. The method of claim 12, wherein the determining the probability that the vehicle will receive the ride request while traveling in the first lane comprises determining the probability based on one or more of historical passenger data, event data, or application usage data.

16. A non-transitory computer-readable medium for lane selection including instructions that when executed by one or more processors cause the one or more processors to:
  determine that a vehicle is traveling on a road with a plurality of lanes, wherein the vehicle is traveling in a curbside lane of the plurality of lanes;
  designate a lane-of-interest from the plurality of lanes, wherein the lane-of-interest is a lane, of the plurality of lanes, having a greatest need, determined by the one or more processors according to a set of lane criteria, to have lane data collected;
  determine a probability that the vehicle will receive a ride request while traveling in the curbside lane, the curbside lane being different from the lane-of-interest; and
  in response to a determination that the probability satisfies a threshold, generate a control signal to cause the vehicle to travel in the lane-of-interest.

17. The non-transitory computer-readable medium of claim 16, further including instructions that when executed by one or more processors cause the one or more processors to:
  collect the lane data from one or more sensors associated with the vehicle while the vehicle travels in the lane-of-interest; and
  provide the lane data to a cloud-computing environment.

18. The non-transitory computer-readable medium of claim 16, wherein the instructions that when executed by the one or more processors cause the one or more processors to designate the lane-of-interest from the plurality of lanes further comprise instructions that when executed by the one or more processors cause the one or more processors to:
  determine a score for each lane of the plurality of lanes based on lane criteria; and
  designate a lane of the plurality of lanes with a highest score as the lane-of-interest.

19. The non-transitory computer-readable medium of claim 16, wherein the threshold is based on a highest score.

20. The non-transitory computer-readable medium of claim 16, wherein at least one of the one or more processors is part of the vehicle or is part of a cloud-computing environment.

* * * * *